May 30, 1933.  A. C. LINDGREN ET AL  1,911,373
TRACTOR OPERATED POWER LIFT
Filed May 26, 1931    3 Sheets-Sheet 1

Inventors
Alexis C. Lindgren
and Arthur D. Gallagher
By
Atty.

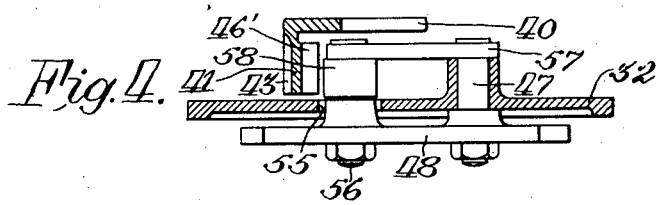
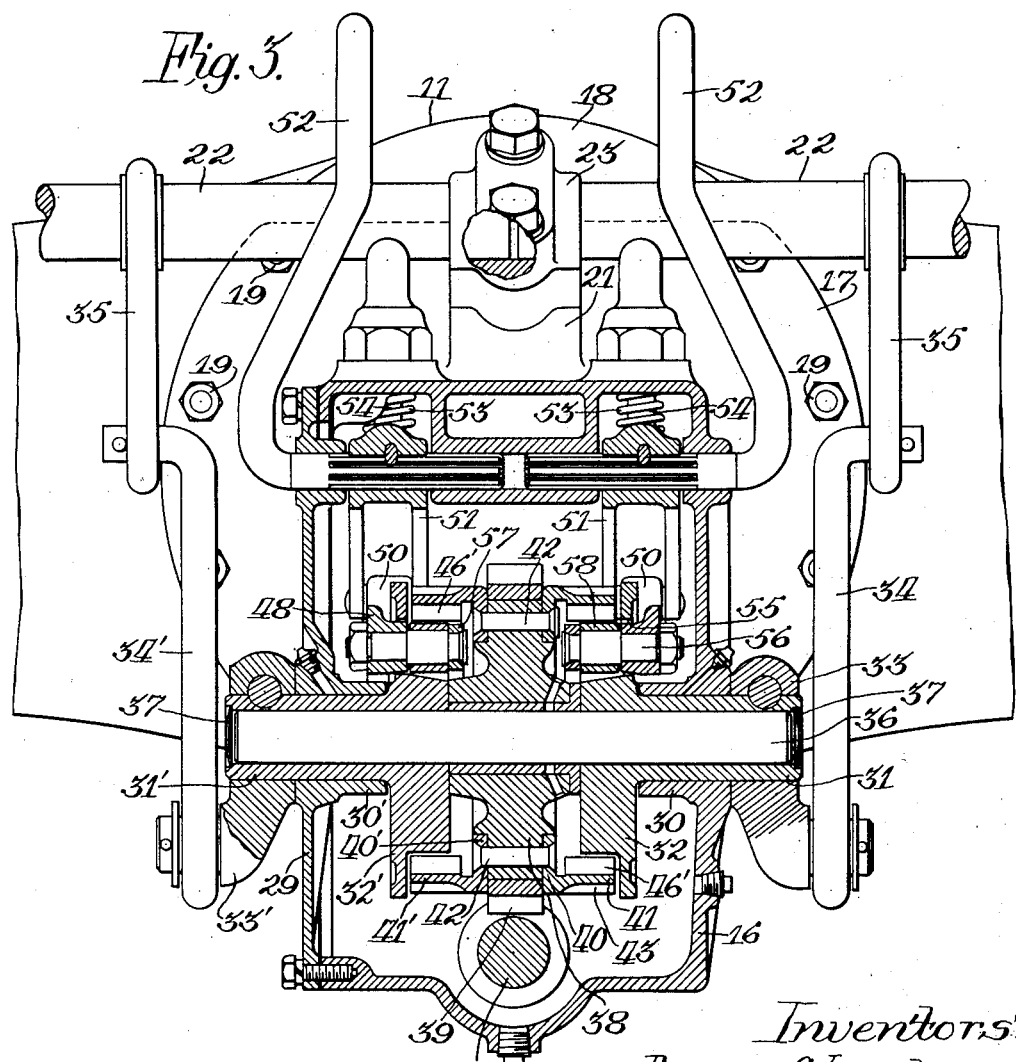

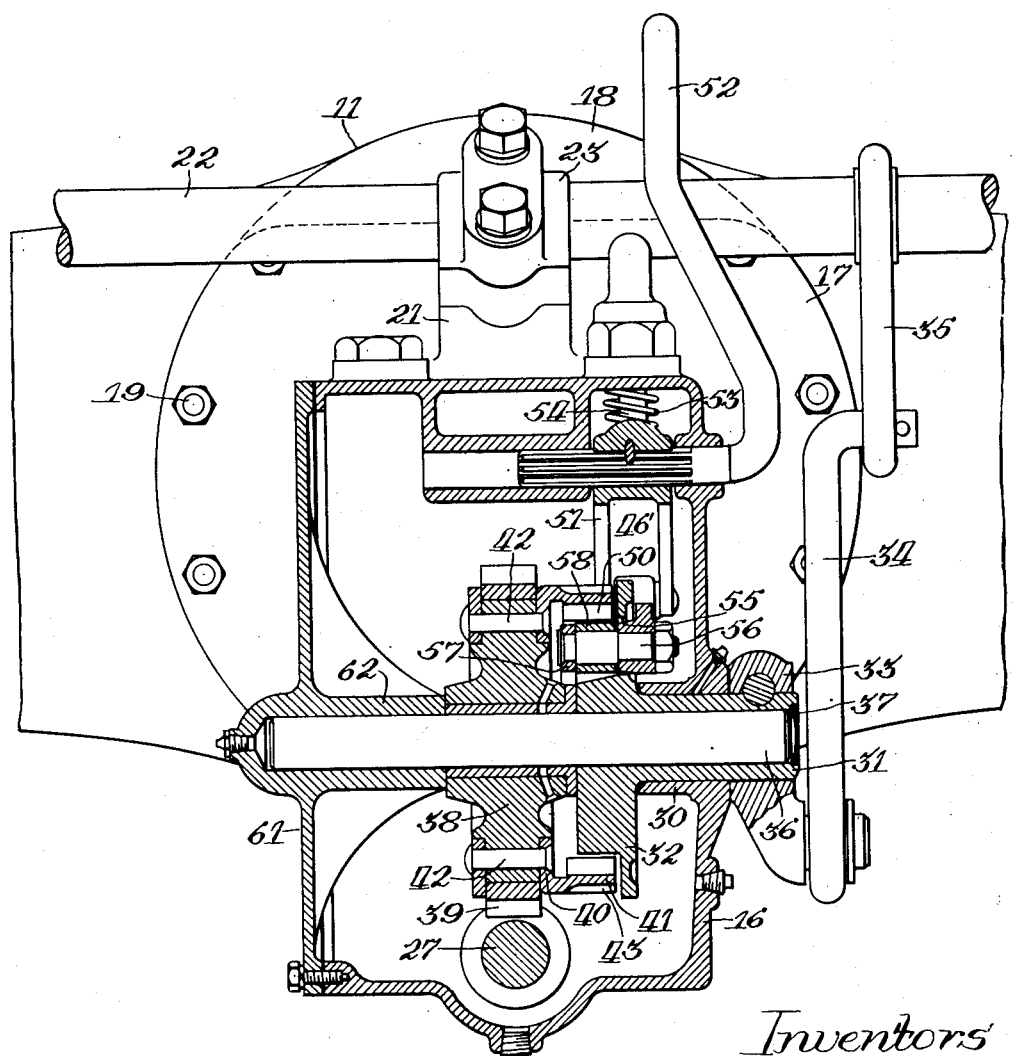

Patented May 30, 1933

1,911,373

UNITED STATES PATENT OFFICE

ALEXUS C. LINDGREN, OF CHICAGO, AND ARTHUR D. GALLAGHER, OF CANTON, ILLINOIS, ASSIGNORS TO INTERNATIONAL HARVESTER COMPANY, A CORPORATION OF NEW JERSEY

TRACTOR OPERATED POWER LIFT

Application filed May 26, 1931. Serial No. 540,142.

This invention relates to power lift attachment for tractors.

A principal object of the invention is to provide a power lift device of novel and improved construction.

Another object is to provide a power lift attachment adapted to be used on well known types of tractors where it can be utilized to best advantage for lifting various elements which may be mounted on the tractor or pulled there behind.

Another object is to provide and position a power lift attachment on the rear axle housing of the tractor in position to receive power from a power take-off shaft actuated by the tractor drive mechanism.

Another object is to provide a power lift construction which may be built up as a single lift unit or as an independently operated double lift unit.

These and other objects, which will be apparent from the detailed description to follow, are accomplished by the construction shown in the drawings, in which:

Figure 3 is a sectional view taken on the line 3—3 of Figure 2;

Figure 4 is a detailed sectional view taken on the line 4—4 of Figure 2; and

Figure 5 is a sectional view, similar to Figure 3, showing a single lift device.

Figure 2:
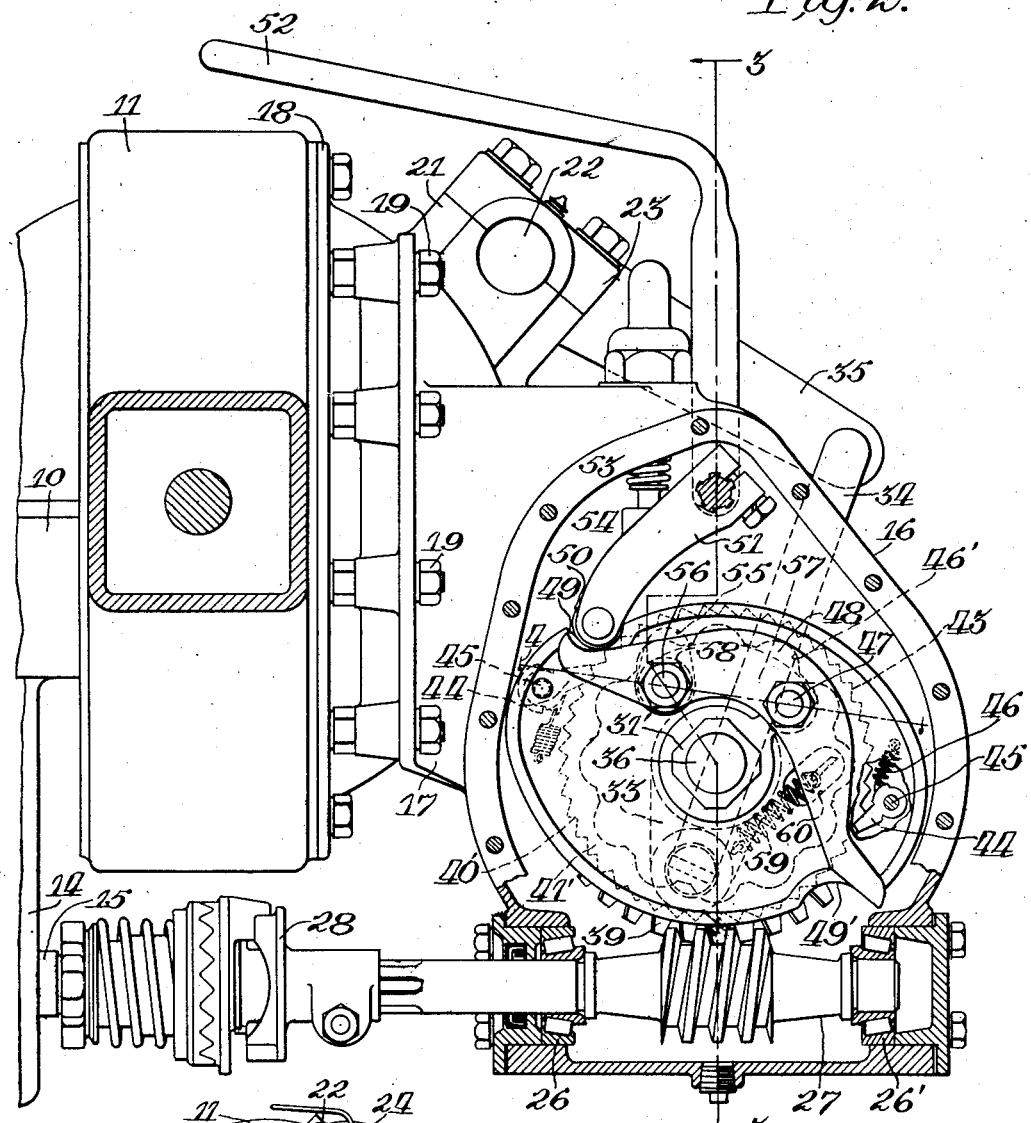
Figure 2 is a side elevation, partly in section, showing a power lift attachment embodying the invention, with the cover plate removed to better illustrate the internal mechanism.

The improved power lift embodying this invention is shown attached to a tractor of a well known construction, having side frame members 10, a rear axle and differential housing 11, downwardly depending housings 12 at each end of the housing 11, and wheels 13 mounted in axles at the lower portions of the housings 12. A depending housing 14, forwardly of the rear axle housing 11, contains gearing connected to the tractor drive mechanism for operating a power take-off shaft 15, which extends centrally rearwardly from said housing under the axle housing 11.

A power lift mechanism is enclosed in a casing 16, which is formed from a unitary casting. Said casing is shaped to house the internal mechanism and is provided with bearings for the shafts making up said mechanism, as will be hereinafter described. The casing 16 also is provided with forwardly extending portions 17, which are formed to fit around a circular plate 18 provided at the rear of the housing 11. A plurality of openings are provided in the extending portions 17, in alignment with the openings formed in the plate 18, whereby bolts 19, threaded into the housing 11, may be utilized for rigidly securing the casing 16 in position behind the housing 11.

Figure 1:
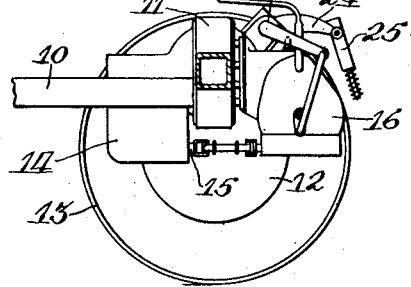
Figure 1 is a diagrammatic view of the rear portion of a tractor, showing the relative position of a power lift embodying the invention.

On the upper side of the casing 16 a substantial bearing bracket 21 is provided. Said bracket forms the lower half of a bearing which embraces a rock shaft 22, extending transversely across the rear of the tractor illustrated in Figure 3. With a double lift attachment the shaft 22 is formed in two sections positioned end to end, the ends coming together within the bearing bracket 21. A cap 23 provides the upper half of the bearing for said shafts. The shafts are provided with other bearings at the outer ends of the housing 11. Said bearings are not shown as such a construction is well known in the art. Levers 24, rigidly secured to the shafts 22, extend rearwardly therefrom and are provided with means for being pivotally attached to links 25, one of which is illustrated in Figure 1. This showing is illustrative of a use to which the power lift may be put; that is, for lifting earth working implements such as may be attached to a tractor and pulled there behind. It is understood that levers may be attached to a rock shaft in any desired position for operating the lifting mechanism positioned at any location on the tractor.

The casing 16 extends somewhat downwardly from the axle housing 11 and is formed at the lower portion with means for holding bearings, illustrated as roller bearings 26 and 26'. Said bearings rotatably support a worm shaft 27. Said shaft has a forwardly extending portion which is in alignment with the power take-off shaft 15 and is connected thereto by a slip clutch 28. Said clutch may be of any conventional construction and provides an overload release to prevent breakage of the power take-off mechanism upon an overload. Oil seals are provided around the bearings 26 and 26' so that oil may be carried in the casing 16. At one side the casing 16 is open and a cover plate 29 is provided and rigidly secured with cap screws to the casing. Substantially centrally of the plate 29 an internally extending flange 30'' is formed. Said flange provides a bearing surface for a sleeve 31'. Said sleeve is integrally attached to a clutch plate member 32' positioned within the casing and extends outwardly beyond the cover plate 29. A similar clutch plate 32 is positioned in the casing in spaced relation with respect to the plate 32'. An integral sleeve 31 of said plate is coaxially positioned with respect to the sleeve 31' and extends through a bearing flange 30 at the side of the casing opposite the cover plate 29. Lever arms 33 and 33' are rigidly secured to the outer ends of the sleeves 31 and 31'. Lifting links 34 and 34' are pivotally attached to said arms and to levers 35 attached to the shafts 22.

A freely rotatable shaft 36 extends into the sleeves 31 and 31'. Expansion plugs 37, fitted into the ends of the sleeve, provide for retaining oil therein and serve to hold the shaft 36 in position. As previously stated, the clutch plates 32 and 32' are arranged in spaced relationship with respect to each other. A central member 38, provided with a sleeve like bushing, is mounted on the shaft 36 and is provided with hub extensions which abut the inner faces of the clutch plates. Said member is freely rotatable on the shaft 36. An annular worm gear 39 is mounted on the member 38 and is of a size and is so positioned to mesh with the worm on the shaft 27. It is to be understood that during operation of the power take-off shaft, the worm shaft 27 and the member 38 are continuously rotated.

A clutch member 40, consisting of an annular portion fitted against a face formed on the member 38 and an outwardly extending flange 41, is rigidly secured by riveted pins 42 to the member 38. In the double lift construction shown in Figure 3 a second clutch member 40' is secured to the opposite face of the member 38. The clutch members 40 and 40' are exactly similar in construction. The same pins 42 which secure the member 40, also secure the member 40'. The flanges 41 and 41' are provided exteriorly with series of ratchet notches 43. Ratchet pawls 44 are secured to the inside of the plates 32 and 32' on pins 45 and extend into engagement with the notches 43. Springs 46 hold the pawls in engagement with the notches. The pawls 44 are directed downwardly, as shown in Figure 2, for a purpose to be described in connection with the explanation of the operation of the device.

As the structure at each side of the power lift is exactly similar in construction, except that one side is left handed with respect to the other, the construction shown on the right hand side in Figure 3 will be described. The flange 41 is provided interiorly with a series of comparatively large depressions 46' smoothly connected together for a purpose to be hereinafter described.

The clutch plate 32 is provided with a pivot pin 47, which provides for swingingly mounting a clutch actuating arm 48. As best shown in Figure 2, said arm is pivoted intermediate its ends at a point spaced from the axis of the plate 32. Said arm has end portions which extend in substantially diametrically opposite position beyond the clutch plate 32. Said plate is not circular in formation, slightly cammed surfaces being formed which terminate in notched portions 49 which have an inside diameter substantially less than the radial dimension of the arm 48 when in extended position and an outside diameter slightly greater than the greatest radial dimension of said arm. This construction provides a track for a roller 50 mounted on a lever arm 51, which is rigidly secured to a cranked hand lever 52 pivoted in the casing on a transverse axis. A spring 53, mounted on a guide 54, engages the lever arm 51, maintaining it at all times in engagement with the outer edge of the plate 32 which forms a track for the roller 50. It will be understood, by inspecting Figure 3, that the arm 48 is outside the plate 32. To provide a clutch engaging means, a slot 55 is formed in the plate 32 through which a roller supporting pin 56 extends. Said pin is rigidly secured to the arm 48 and is additionally held in alignment by a link 57 secured to the pin 46 and to the pin 47. A roller 58 is mounted on the pin 56 on the inner side of the plate 32, in position to engage the depressions 46 formed interiorly of the flange 41. A spring 59 is secured to the arm 48 at the end opposite the end at which the roller 58 is attached, and to the plate 32. As shown in Figure 2, an opening 60 is provided in the plate 32 through which an integral portion of the arm 48 extends to provide means for attaching the spring 59.

Figure 5 shows the power lift of the invention assembled as a single lift unit. The construction, as utilized, provides for the use of a single lift by merely assembling the right hand side of the unit together with the centrally located parts and providing a cover plate 61, formed with an integral extension 62, to provide a bearing for the shaft 36. All other parts of the device are exactly the same as in the double unit form described. When only one unit is used the shaft 22 will be in one piece, whereby lever arms may be attached at either end thereof for simultaneous operation by the lift.

With the power lift casing and its associated parts rigidly secured in position at the rear of the tractor and operatively connected to the power take-off, the arms 33 and 33' may be connected by suitable linkage to any devices mounted on or attached to the tractor in which a movement may be required for adjustment or operation which can be provided by the movement of said arms as actuated by the mechanism in the casing. Figure 1 is illustrative of an embodiment of the invention whereby the rock shafts 22 are transversely mounted on the rear of the tractor and are attached by lever arms 35 and links 34 to the arms 33 and 33'. The lever 24, of which there may be a plurality on either of the shafts 22, may be attached as shown, by linkages 25 to soil working implements attached to the tractor for trailing there behind. When it is desirable to rotate either of the shafts 22, the corresponding operating lever 52 is actuated. As operated in the single lift shown in Figure 5, or the right hand side of the double lift shown in Figure 3, the lever 52 is lifted upwardly about its bearing in the casing 16, whereby the lever arm 51 is lifted upwardly against the pressure of the spring 53, removing the roller 50 from its position in the notch 49 and seating against the extension on the arm 48. The spring 59 rotates the released arm about its pivot on the pin 47, thereby resiliently urging the roller 58 against the depressions 46' formed in the flange 41. Said roller seats in one of the depressions 46' of the flange, thereby locking the clutch plate 32 with respect to the central clutch member 38. The clutch member, being continuously driven through the gear 39 mounted thereon, and the worm 27 rotate the clutch plate with the roller 50 riding around the outer edge of the plate. The spring 53 urges the roller against the edge of the plate 32. The decreasing diameter of the plate 32 forms a cam, the roller 50 following said cam for approximately 180 degrees until it engages the opposite extension of the arm 48. Upon engagement said arm is rotated about its pivot pin 47, thereby withdrawing the roller 58 from engagement with the depressions in the flange 41. As soon as said roller is disengaged there is no longer a torque transmitting effort exerted on the plate 32. The roller 50, therefore, seats in a depression 49' substantially diametrically opposite the notch 49 and holds the plate 32 in stationary position until the hand lever 52 is again operated. By this construction and operation, as described, the clutch plate 32 is given a movement of rotation of approximately half revolution, or 180 degrees, upon each operation of the lever 52. The arm 33, which is attached outside the casing to the sleeve extension 31 on the plate 32, is positioned on said sleeve at the proper angle to secure a relatively up and down movement of the arm in final position, or a fore and aft movement, whichever may be desirable for the construction in which the lift is being utilized.

Referring to Figure 3, clutch member 40, which carries the notches 41, rotates in a clockwise direction, the pawls 44 extend toward the circumference of the member 40 in the general direction of rotation thereof, whereby the member 40 may rotate with the pawls 44 ratcheting over the notches 43, being held thereagainst by the springs 46. It is evident, of course, that when the clutch member 40 and the clutch plate 32 are locked together for rotation, the pawls 44 are stationary. However, in some conditions of operation where a comparatively large load, such as the weight of a heavy plow, was carried on the arm 33, as soon as said arm passed a dead center there would be a tendency for the force exerted on the arm to rotate the clutch plate 32 ahead of the clutch member 40. The clutch arm 48 is so pivoted, with respect to the two members to which it engages, that under a load as described, the roller 58 would not be held against depressions 46 with any substantial amount of force. It is evident, therefore, that with a condition as described, the arm 33 would be rapidly rotated forwardly with little resistance against its rotation with a rapid drop of the load being carried, for example, the plow as previously mentioned.

The pawls 44 are designed and positioned to prevent an over-running action of this kind. As shown in Figure 2, the pawls are directed toward the notches in the direction of rotation of the plate which carries them. Due to the action of said pawls, the clutch plate 32 can never rotate in the same direction as the clutch member 40, at a higher rate of speed than said member. This provides for a uniform lowering movement of any load which may be carried on the arm 33.

The operation of the double lift is exactly the same as that of the single lift, or as of one side of the double lift as described. The construction is particularly advantageous from a commercial viewpoint, whereby substantially the same elements may be used for either a single or double lift. Moreover, a second lift may be added at any time to a single lift.

Although this invention has been illustrated and described as embodied in a separate casing secured to the differential housing, the same construction may be embodied in a housing formed as an integral part of the differential housing and may be driven from a concealed shaft within said housing.

It is to be understood that applicant contemplates as his invention any modification which falls within the scope of the appended claims.

What is claimed is:

1. A power lift for tractors, comprising in combination with a tractor, a casing, means for supporting said casing with respect to the tractor, a clutch plate positioned in the casing and having a bearing portion extending therethrough, a lifting arm attached to said portion outside the casing, a clutch member rotatably mounted in the casing, means actuated from the tractor drive mechanism for continuously rotating said clutch member, manually actuated means operative to engage the clutch plate for rotation with the clutch member, said means including means automatically operable to disengage said plate after a predetermined angle of revolution, and means operative to positively prevent rotation of the clutch plate with respect to the clutch member in the direction of rotation of said member.

2. A power lift for tractors, comprising in combination with a tractor, a casing, means for supporting said casing with respect to the tractor, a clutch plate positioned in the casing and having a bearing portion extending therethrough, a lifting arm attached to said portion outside the casing, a clutch member rotatably mounted in the casing, means actuated from the tractor drive mechanism for continuously rotating said clutch member, manually actuated means operative to engage the clutch plate for rotation with the clutch member, said means including means automatically operable to disengage said plate after a predetermined angle of revolution, and ratchet means positioned between the clutch plate and the clutch member, operative to positively prevent rotation of the clutch plate with respect to the clutch member in the direction of rotation of said member.

3. A power lift for tractors, comprising in combination with a tractor, a casing, means for supporting said casing with respect to the tractor, a pair of clutch plates positioned in the casing and having bearing portions extending through the casing, lifting arms attached to said portions outside the casing, a clutch member rotatably mounted in the casing, means actuated from the tractor drive mechanism for continuously rotating said clutch member, and manually operable means to engage either of said clutch plates with said clutch member.

4. A power lift for tractors, comprising in combination with the tractor, a casing, means for supporting said casing with respect to the tractor, a pair of clutch plates positioned in the casing and having bearing portions extending from the casing, lifting arms attached to said portions outside the casing, a clutch member rotatably mounted in the casing between said plates, means actuated from the tractor drive mechanism for continuously rotating said clutch member, and manually operable means to engage either of the clutch plates with said clutch member.

5. A power lift for tractors, comprising in combination with the tractor, a casing, means for supporting said casing with respect to the tractor, a pair of clutch plates positioned in the casing and having bearing portions extending through the casing, lifting arms attached to said portions outside the casing, a clutch member rotatably mounted in the casing, a gear carried by said clutch member and an engaging gear actuated from the tractor drive mechanism for continuously rotating said clutch member, and manually operable means to engage either of said clutch plates with said clutch member.

6. A power lift for tractors, comprising in combination with a tractor, a casing, means for supporting said casing with respect to the tractor, a pair of clutch plates positioned in the casing and having bearing portions extending through the casing, lifting arms attached to said portions outside the casing, a clutch member rotatably mounted in the casing, a worm gear carried by said member, a driving worm mounted in the casing in operative engagement with said gear, means actuated from the tractor drive mechanism for continuously rotating said worm, and manually operable means to engage either of said clutch plates with said clutch member.

7. A power lift for tractors, comprising in combination with a tractor, a casing, means for supporting said casing with respect to the tractor, a pair of clutch plates positioned in the casing and having bearing portions extending through the casing, lifting arms attached to said portions outside the casing, a clutch member rotatably mounted in the casing, means actuated from the tractor drive mechanism for continuously rotating said clutch member, manually operable means to engage either of said clutch plates with said clutch member, and means operatively associated with each of the clutch plates and the clutch member effective to prevent overrunning rotation of the clutch plates with respect to the clutch member.

8. A power lift for tractors, comprising in combination with a tractor, a casing, means for supporting said casing with respect to the tractor, a pair of clutch plates positioned in the casing and having bearing portions extending through the casing, lifting arms attached to said portions outside the casing, a clutch member rotatably mounted in the casing, means actuated from the tractor drive mechanism for continuously rotating said clutch member, manually operable means to engage either of said clutch plates with said clutch member, ratchet means mounted on each of the clutch plates, and notches on the clutch member positioned to be engaged by said means to prevent overrunning action of the clutch plates with respect to the clutch member.

9. A power lift attachment for tractors, comprising in combination with a tractor, a casing, means for supporting said casing with respect to the tractor, a pair of clutch plates having their faces in spaced relationship in the casing and having bearing portions extending through the casing, lifting arms attached to said portions, a clutch member mounted for rotation between said plates, means operated by the tractor drive mechanism for continuously rotating said member, ratchet teeth formed around the outside of said member at each side thereof, ratchet pawls mounted on the plates in spring pressed contact with said teeth and extending in a direction to prevent overrunning rotation of said plates with respect to said member, a clutch dog pivotally mounted on each of the clutch plates constructed to engage the clutch member, and manually operable means for engaging either of the clutch dogs with the clutch member.

10. A power lift attachment for a tractor, comprising in combination with a tractor having a rear axle housing and a power take-off shaft centrally below said housing, of a casing secured to said housing, said casing having a removable cover plate at one side thereof, a bearing formed centrally in said plate, an aligned bearing formed in the wall of the casing opposite said plate, a pair of clutch plates having their faces in spaced relationship in the casing and having integral hub extensions fitted into the bearings in the housing and cover plate, a shaft freely rotatable in aligned bores formed in said hubs, lifting arms rigidly secured to the outer ends of the hubs, a central member carrying a worm gear rotatably mounted on the center shaft, a worm positioned in driving relationship with said gear, said worm being mounted in bearings carried by the housing and being positioned in alignment with and operatively connected to the power take-off shaft, oppositely extending clutch members secured to the central member, ratchet teeth formed around the outside of said members, ratchet dogs mounted in the housing in spring pressed contact with said teeth, a clutch dog mounted on each of the clutch plates, said dogs having portions extending radially beyond the clutch plates, each of said clutch dogs carrying a roller and being spring pressed with the roller against the interior of one of the clutch members, said clutch members being formed internally with a plurality of notches adapted to be engaged by the rollers on the clutch dogs, and means to independently engage either of the clutch dogs with its respective clutch member whereby the clutch plate is rotated until the clutch dog is again thrown out of engaging position.

In testimony whereof we affix our signatures.

ALEXUS C. LINDGREN.
ARTHUR D. GALLAGHER.